United States Patent
Jung

(10) Patent No.: US 8,360,591 B2
(45) Date of Patent: Jan. 29, 2013

(54) BACKLIGHT UNIT FOR LIQUID CRYSTAL DISPLAY DEVICE

(75) Inventor: Jong-hoon Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 12/478,023

(22) Filed: Jun. 4, 2009

(65) Prior Publication Data

US 2009/0310339 A1    Dec. 17, 2009

(30) Foreign Application Priority Data

Jun. 17, 2008   (KR) .................. 10-2008-0057025

(51) Int. Cl.
G09F 13/04  (2006.01)
G09F 13/08  (2006.01)

(52) U.S. Cl. ....... 362/97.1; 439/325; 439/328; 439/329; 362/612; 362/249.02

(58) Field of Classification Search ........ 362/97.1–97.4, 362/612, 555, 561, 219, 249.02, 249.04, 362/249.06; 439/325, 328, 329
See application file for complete search history.

(56) References Cited

U.S. PATENT DOCUMENTS

| | | | | |
|---|---|---|---|---|
| 4,695,112 A * | 9/1987 | Maston et al. | ............... | 439/350 |
| 4,974,121 A * | 11/1990 | Masuko et al. | ............... | 361/826 |
| 6,342,932 B1 * | 1/2002 | Terao et al. | ............... | 349/58 |
| 7,212,413 B2 * | 5/2007 | Chang et al. | ............... | 361/749 |
| 7,264,480 B2 * | 9/2007 | Park | ............... | 439/61 |
| 7,400,029 B2 * | 7/2008 | Shimada et al. | ............... | 257/625 |
| 7,626,672 B2 * | 12/2009 | Song | ............... | 349/150 |
| 7,931,387 B2 * | 4/2011 | Song | ............... | 362/249.02 |
| 2005/0202694 A1 * | 9/2005 | Yumoto et al. | ............... | 439/67 |
| 2006/0264093 A1 * | 11/2006 | Shim | ............... | 439/495 |
| 2007/0021007 A1 * | 1/2007 | Park | ............... | 439/610 |
| 2008/0079888 A1 * | 4/2008 | Park | ............... | 349/149 |

FOREIGN PATENT DOCUMENTS

| | | |
|---|---|---|
| JP | 2004-55160 A | 2/2004 |
| JP | 2004-199896 A | 7/2004 |
| KR | 10-2007-0025825 A | 3/2007 |
| KR | 10-2007-0071543 A | 7/2007 |
| KR | 10-2008-0032757 A | 4/2008 |
| WO | WO 2005086865 A2 | 9/2005 |

OTHER PUBLICATIONS

Communication dated Apr. 4, 2012 issued by the Mexican Patent Office in Corresponding Mexican Application No. MX/a/2010/013573.

(Continued)

*Primary Examiner* — Danielle Allen

(74) *Attorney, Agent, or Firm* — Sughrue Mion, PLLC

(57) ABSTRACT

Provided is a backlight unit for a liquid crystal display device. The backlight unit includes: a chassis; a printed circuit board connected to a side of the chassis, the printed circuit board including a plurality of light emitting diodes, and a pair of conductive pads through which power is supplied to the light emitting diodes, wherein the pair of conductive pads are disposed on an end of the printed circuit board; and a power socket into which the pair of the conductive pads are inserted.

19 Claims, 6 Drawing Sheets

OTHER PUBLICATIONS

Communication dated Oct. 3, 2011 issued by the Mexican Patent Office in counterpart Mexican Patent Application No. MX/a/2010/013573.

Chinese Office Action dated Feb. 28, 2012 issued in Chinese Application No. 200980121480.4.

Office Action, dated Oct. 26, 2012, issued by the Mexican Patent Office in counterpart Mexican Application No. MX/a/2010/013573.

Office Action, dated Nov. 19, 2012, issued by the State Intellectual Property Office of the P.R.C. in counterpart Chinese Application No. 200980121480.4.

* cited by examiner

BACKLIGHT UNIT FOR LIQUID CRYSTAL DISPLAY DEVICE

CROSS-REFERENCE TO RELATED PATENT APPLICATION

This application claims the priority from Korean Patent Application No. 10-2008-0057025, filed on Jun. 17, 2008, in the Korean Intellectual Property Office, the disclosure of which is incorporated herein in its entirety by reference.

BACKGROUND OF THE INVENTION

1. Field of the Invention

The present invention relates to a backlight unit for a liquid crystal display device, and more particularly, to a backlight unit for a liquid crystal display device using a light emitting diode (LED) as a light source.

2. Description of the Related Art

A liquid crystal display (LCD) device is a type of light receiving display device that form images by receiving external light instead of using self-emitting light, unlike a plasma display panel (PDP) and a field emission display (FED). Thus, an LCD has a backlight unit for emitting light to a liquid crystal layer at a rear surface thereof.

A related art backlight unit for an LCD device uses a cold cathode fluorescent lamp (CCFL) as a light source. However, when a CCFL is used as a light source, brightness may be decreased and it is difficult to secure uniform brightness as the screen size of the LCD device increases. Thus, in order to overcome these problems, a backlight unit using light emitting diodes (LEDs) as a light source has been developed recently.

FIG. 1 is an exploded perspective view of a related art backlight unit for a LCD device, which uses LEDs as a light source. In particular, the backlight unit illustrated in FIG. 1 is an edge light emitting type LED backlight unit.

Referring to FIG. 1, one end of a chassis 100 is bent at a right angle to form a bent portion 100a. A printed circuit board (PCB) 120, on which a plurality of LEDs 121 are aligned, is connected to an inner surface of the bent portion 100a. A connector 140 for supplying power is formed at one end of the PCB 120. The connector 140 is electrically connected to a housing 150 which includes power supply terminals. The housing 150 is connected to power supply lines 151a and 151b for supplying power, and the chassis 100 has a through hole 160 through which the power supply lines 151a and 151b pass. According to FIG. 1, the PCB 120 is connected to one side of the bent portion 100a using screws 130 that engage first screw holes 105 formed in the bent portion 100a and second screw holes 125 formed in the PCB 120. A light guide plate which guides light emitted from the LEDs 121 to a liquid crystal layer (not shown) of the LCD device is aligned at an inner portion of the chassis 100.

In order to manufacture a backlight unit having the structure described above, the housing 150 is connected to the connector 140 of the PCB 120, and the PCB 120 is connected to one side of the bent portion 100a. However, the related art backlight unit needs to include elements such as the connector 140 and the housing 150, and the time required to manufacture the unit may be increased since the PCB 120 and the chassis 100 are assembled after the housing 150 and the connector 140 are assembled.

SUMMARY OF THE INVENTION

The present invention provides a backlight unit for an LCD using an LED as a light source, whereby the backlight unit can be manufactured inexpensively using a relatively simple process.

According to an aspect of the present invention, there is provided a backlight unit for an LCD device, the backlight unit comprising: a chassis; a printed circuit board connected to at least one side of the chassis, comprising a plurality of light emitting diodes aligned in a predetermined shape, and comprising a pair of conductive pads for supplying power to the light emitting diodes, wherein the pair of conductive pads are disposed at least one end of the printed circuit board, respectively; and a power socket into which the pair of the conductive pads are inserted, respectively.

The power socket may be fixed to at least one side of the chassis. The power socket may comprise: a socket housing; and a pair of power supply terminals corresponding to the pair of the conductive pads and formed in the socket housing. The pair of the conductive pads may be inserted into the socket housing to be electrically connected to the pair of power supply terminals.

The pair of power supply terminals may comprise a conductive elastic material.

The socket housing may comprise a pair of grooves into which the pair of the conductive pads are inserted. The socket housing may comprise a single groove into which the pair of the conductive pads are inserted.

The chassis may have a through hole through which power supply lines for supplying power to the pair of power supply terminals of the power socket pass.

The pair of the conductive pads may be formed by exposing a conductive material which is formed on the printed circuit board.

At least one end of the chassis may be bent at a right angle to form a bent portion, and the printed circuit board is connected to an inner surface of the bent portion of the chassis. The printed circuit board may have a strip shape, and the light emitting diodes are aligned on the printed circuit board in a line.

According to another aspect of the present invention, there is provided an edge light emitting type LED backlight unit for an LCD device comprising a plurality of LEDs on at least one side of a chassis, the backlight unit comprising: a printed circuit board connected to at least one side of the chassis, comprising a plurality of light emitting diodes aligned in a predetermined shape, and comprising a pair of conductive pads at least one end of the printed circuit board; and a power socket, fixed to at least one side of the chassis, into which the pair of the conductive pads are inserted, respectively.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
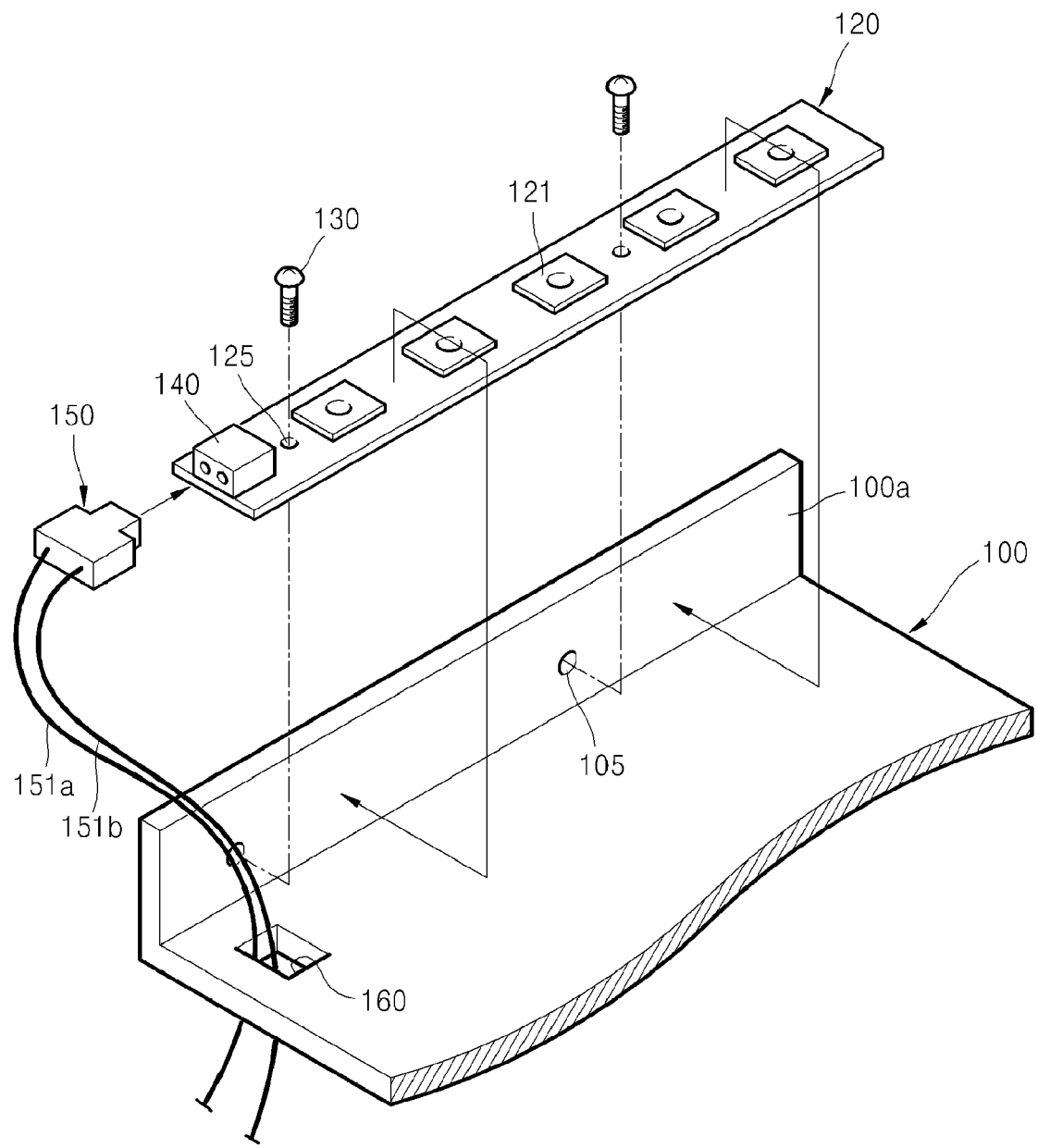
FIG. 1 is an exploded perspective view of a related art backlight unit for an LCD.

Hereinafter, exemplary embodiments of the present invention will now be described more fully with reference to the accompanying drawings. In the drawings, like reference numerals in the drawings denote like elements, and the thickness and size of elements are exaggerated for clarity.

The present invention provides an edge light emitting type LED backlight unit using a plurality of LEDs as a light source in which the LEDs are aligned on one side or on both sides of a chassis.

Figure 2:
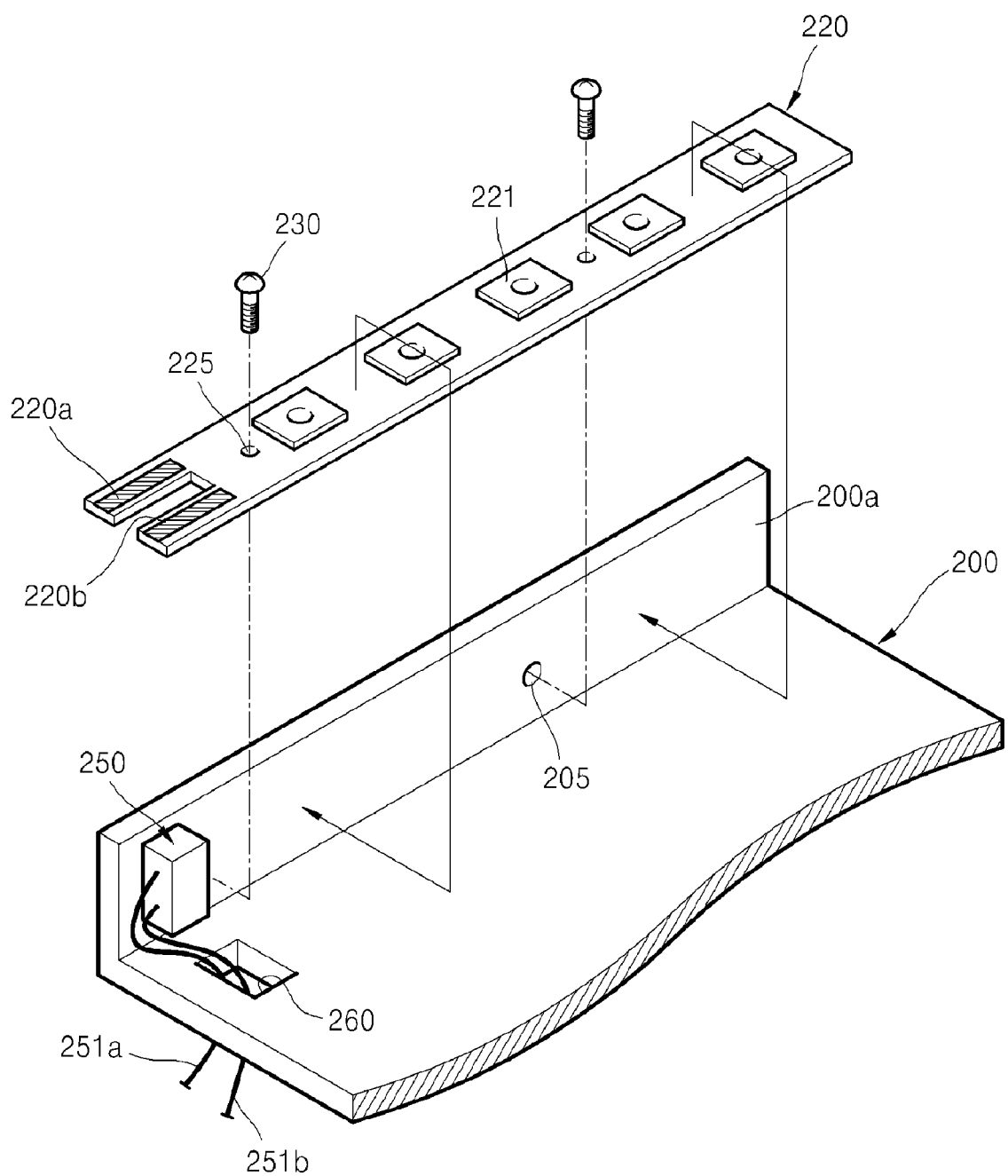
FIG. 2 is an exploded perspective view of a backlight unit for an LCD, according to an exemplary embodiment of the present invention.

FIG. 2 is an exploded perspective view of a backlight unit for an LCD according to an exemplary embodiment of the present invention. Referring to FIG. 2, the backlight unit for an LCD includes a chassis 200 including a bent portion 200a bent at a right angle relative to the chassis 200, a PCB 220 connected to a first side of the bent portion 200a, and a power socket 250 fixed to the first side of the bent portion 200a. Screws 230, first screw holes 205 formed in the bent portion 200a, and second screw holes 225 formed in the PCB 220, are used to connect the PCB 220 to the bent portion 200a.

A plurality of LEDs 221 are aligned on the PCB 220. In this regard, the PCB 220 may have a strip shape, and the LEDs 221 may be aligned on the PCB 220 in a predetermined configuration, for example, in a line. However, the LEDs 221 may be aligned in various shapes without limitation. In addition, even though the LEDs 221 may be aligned with one another on the PCB 220 in a line as illustrated FIG. 2, the LEDs 221 may be aligned in two or more lines.

A pair of conductive pads 220a and 220b are formed at one end of the PCB 220 to supply power to the LEDs 221. The conductive pads 220a and 220b correspond to a pair of power supply terminals 252a and 252b formed in a power socket 250 which will be described later. In addition, the power socket 250 is fixed to the first side of the bent portion 200a to which the PCB 220 is connected. The power socket 250 is electrically connected to the conductive pads 220a and 220b formed at one end of the PCB 220 to supply power to the LEDs 221. The power socket 250 is connected to power supply lines 251a and 251b which supply power, and a through hole 260 may be formed in the bottom of the chassis 200 through which the power supply lines 251a and 251b pass.

Figure 3:
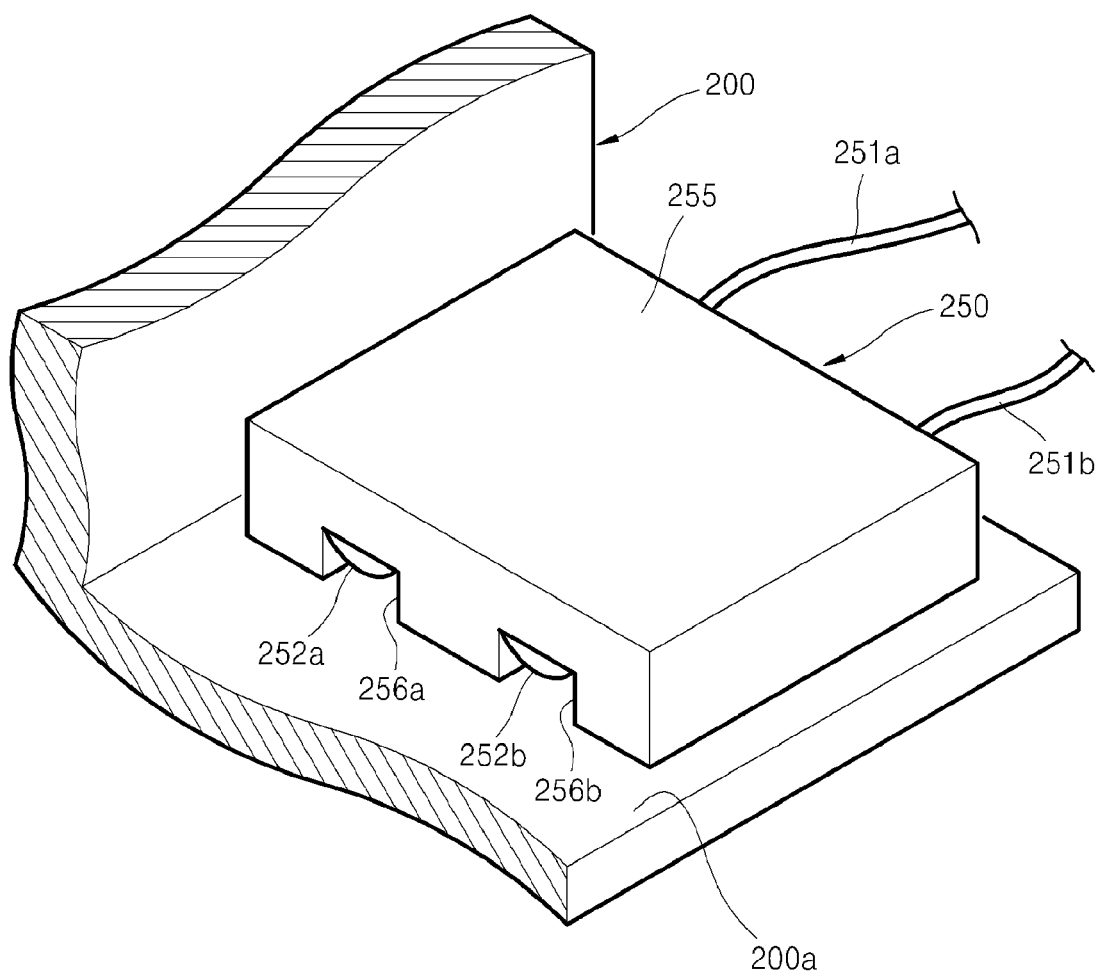
FIG. 3 is a perspective view of a power socket that may be used in the backlight unit illustrated in FIG. 2, according to an exemplary embodiment of the present invention.
Figure 4A:
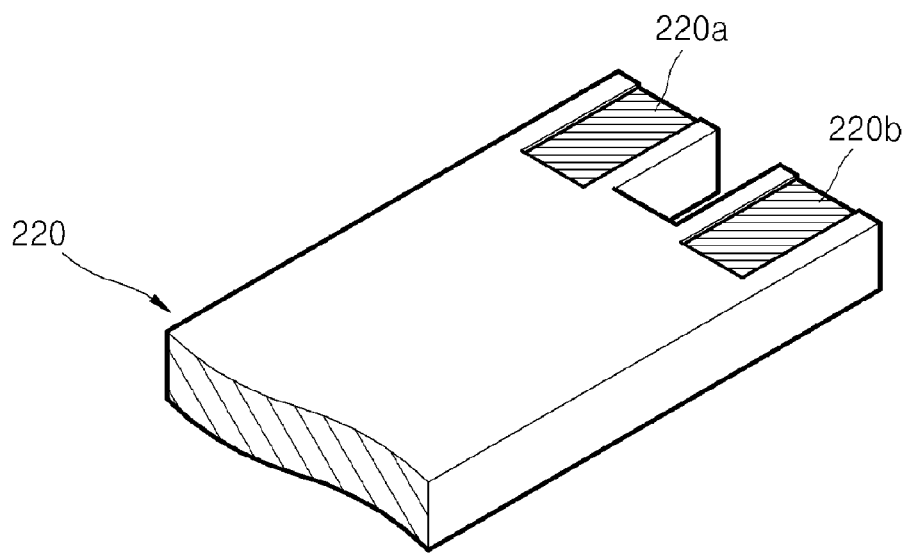
FIGS. 4A and 4B are perspective views of conductive pads of PCBs which can be inserted into the power socket illustrated in FIG. 3, according to exemplary embodiments of the present invention.
Figure 4B:
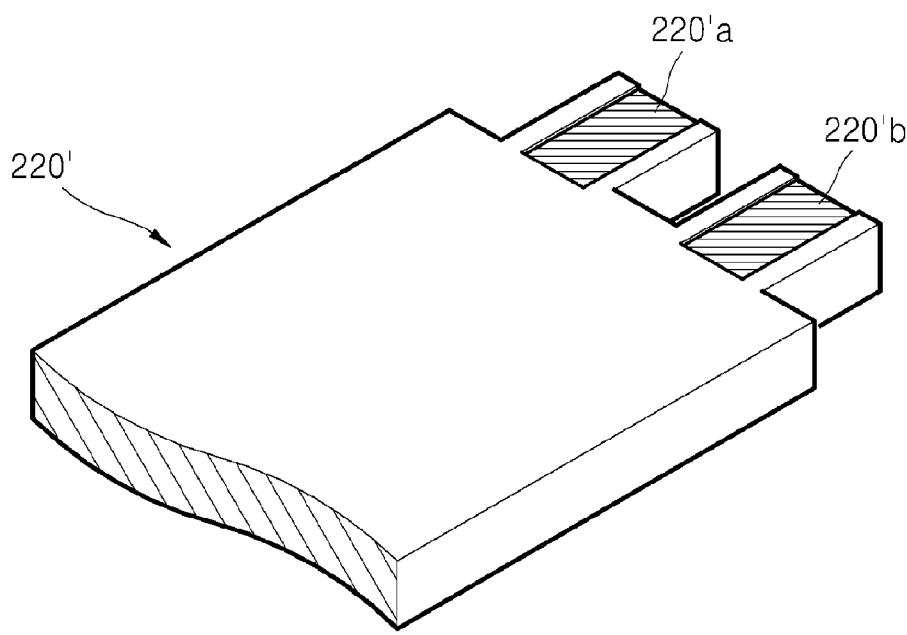

FIG. 3 is a perspective view of the power socket 250 that may be used in the backlight unit illustrated in FIG. 2, according to an exemplary embodiment of the present invention. FIGS. 4A and 4B are perspective views of exemplary embodiments of the conductive pads 220a and 220b, and conductive pads 220'a and 220'b of the PCB 220 and a PCB 220', respectively, which can be inserted into the power socket 250 illustrated in FIG. 3.

Referring to FIG. 3, the power socket 250 includes a socket housing 255 fixed to the first side of the bent portion 200a, a pair of grooves 256a and 256b formed in the socket housing 255, and a pair of power supply terminals 252a and 252b formed in the grooves 256a and 256b, respectively. In this regard, the pair of the grooves 256a and 256b are separated from each other by the socket housing 255. One end of the PCB 220 illustrated in FIG. 4A or the PCB 220' illustrated in FIG. 4B is inserted into the pair of the grooves 256a and 256b.

Referring to FIG. 4A, one end of the PCB 220 is branched off into two portions, and the pair of conductive pads 220a and 220b are formed on the branched portions. In this regard, the pair of the conductive pads 220a and 220b are formed so as to correspond to the pair of power supply terminals 252a and 252b formed in the power socket 250. Accordingly, the pair of the conductive pads 220a and 220b are inserted into the grooves 256a and 256b of the power socket 250 to be electrically connected to the pair of the power supply terminals 252a and 252b. In this regard, the power supply terminals 252a and 252b in the power socket 250 may be formed of a conductive elastic material such as a metal spring for easy contact with the conductive pads 220a and 220b. In addition, the conductive pads 220a and 220b may be formed by exposing a conductive material which is formed on the PCB 220. That is, if a conductive material which is covered with an insulating layer is formed on the PCB 220, the conductive pads 220a and 220b may be formed by removing the insulating layer to expose the conductive material.

FIG. 4B is a modified example of the terminal of the PCB shown in FIG. 4A. Referring to FIG. 4B, the PCB 220' is similar to the PCB 220 of FIG. 4A, except that the width of the PCB 220' is greater than that of the PCB 220. Thus, more LEDs 221 (FIG. 2) may be aligned on the PCB 220' having a greater width than that of the PCB 220. In FIG. 4B, the PCB 220' includes a pair of conductive pads 220'a and 220'b corresponding to the pair of power supply terminals 252a and 252b formed in the power socket 250.

As described above, the power socket 250, into which the conductive pads 220a and 220b formed at one end of the PCB 220 or the conductive pads 220'a and 220'b formed at one end of the PCB 220' are inserted, is fixed to the first side of the bent portion 200a of the chassis 200 in the backlight unit for a LCD. Accordingly, there is no need for elements such as a connector formed on the PCB and a housing connected to the connector which are required for a conventional backlight unit as illustrated in FIG. 1. Thus, manufacturing costs may be reduced. In addition, in order to fabricate a backlight unit for LCD according to the present invention, one end of the PCB having a pair of conductive pads may be inserted into the power socket which is fixed to the chassis. Thus, manufacturing processes may be simplified.

Figure 5:
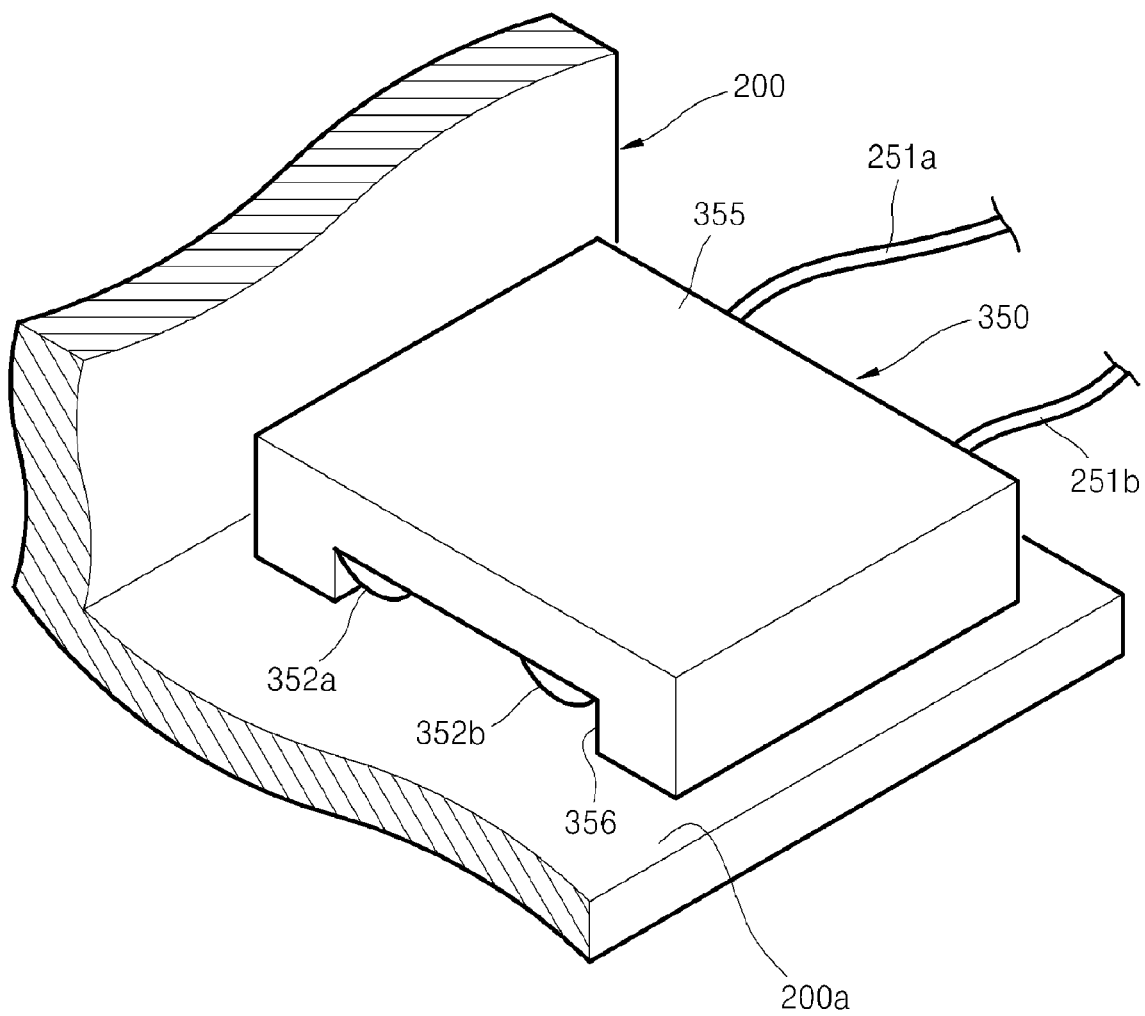
FIG. 5 is a perspective view of a power socket that may be used in the backlight unit illustrated in FIG. 2, according to another exemplary embodiment of the present invention.
Figure 6A:
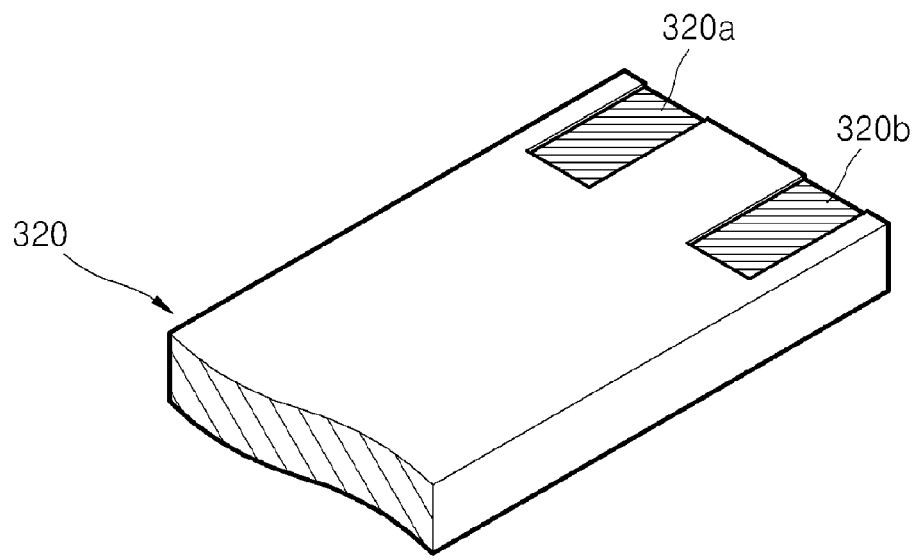
FIGS. 6A and 6B are perspective views of conductive pads of PCBs which can be inserted into the power socket illustrated in FIG. 5, according to exemplary embodiments of the present invention.
Figure 6B:
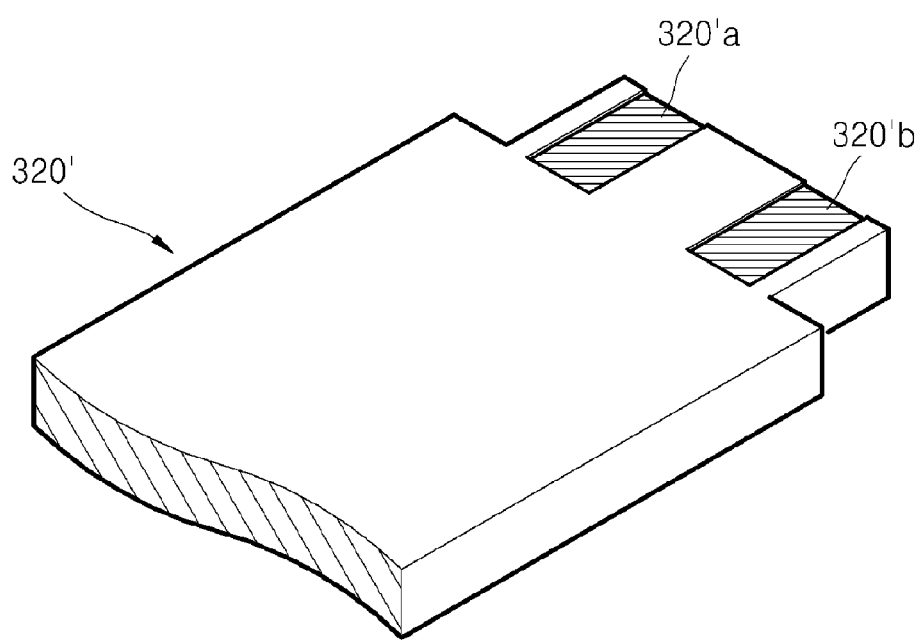

FIG. 5 is a perspective view of a power socket 350 that may be used in the backlight unit illustrated in FIG. 2, according to another exemplary embodiment of the present invention. FIGS. 6A and 6B are perspective views of conductive pads 320a and 320b, and conductive pads 320'a and 320'b of PCBs 320 and 320', respectively, which can be inserted into the power socket 350 illustrated in FIG. 5, according to embodiments of the present invention.

Referring to FIG. 5, the power socket 350 includes a socket housing 355 fixed to the first side of the bent portion 200a, a single groove 356 formed in the socket housing 355, and a pair of power supply terminals 352a and 352b formed in the groove 356. One end of either the PCB 320 or the PCB 320' illustrated in FIG. 6A or 6B is inserted into the groove 356.

Referring to FIG. 6A, the pair of conductive pads 320a and 320b are formed on one end of the PCB 320. In this regard, the pair of the conductive pads 320a and 320b are formed so as to correspond to the pair of power supply terminals 352a and 352b formed in the power socket 350. Accordingly, the pair of conductive pads 320a and 320b are inserted into the groove 356 of the power socket 350 to be electrically connected to the pair of the power supply terminals 352a and 352b. In this regard, the power supply terminals 352a and 352b of the power socket 350 may be formed of a conductive elastic material such as a metal spring for easy contact with the conductive pads 320a and 320b. In addition, the conductive pads 320a and 320b may be formed by exposing a conductive material which is formed on the PCB 320.

FIG. 6B is a modified exemplary embodiment of the terminal of the PCB shown in FIG. 6A. Referring to FIG. 6B, the PCB 320' is similar to the PCB 320 of FIG. 6A, except that the width of the PCB 320' is greater than that of the PCB 320. Thus, more LEDs 221 can be aligned on the PCB 320' having a greater width than that of the PCB 320. In FIG. 6B, the PCB 320' includes a pair of conductive pads 320'a and 320'b corresponding to the pair of power supply terminals 352a and 352b formed in the power socket 350.

The power sockets 250 and 350 and one end of the PCBs 220, 220', 320 and 320' illustrated in FIGS. 3 to 6B are described for illustrative purposes only. The exemplary embodiments described above may be modified in various forms by those skilled in the art, and the scope of the present invention is not limited to these embodiments.

Furthermore, even though it has been described that the PCB including LEDs is formed on only one side of the chassis, the PCB can also be formed on the other side of the chassis. In addition, even though it has been described that a pair of conductive pads are formed on only one end of the PCB, the conductive pads can also be formed on the both ends of the PCB. In this regard, two power sockets which correspond to the two pairs of the conductive pads formed on both ends of the PCB can be fixed to one side of the chassis.

As described above, according to the present invention, a backlight unit for a LCD can be manufactured inexpensively and using a relatively simple process.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight unit for a liquid crystal display (LCD) device, the backlight unit comprising:
   a chassis;
   a printed circuit board connected to a side of the chassis, the printed circuit board comprising a plurality of light emitting diodes, and a pair of conductive pads through which power is supplied to the light emitting diodes, wherein the pair of conductive pads are disposed on an end of the printed circuit board; and
   a power socket which is fixed to at least one side of the chassis to which the printed circuit board is connected and into which the pair of the conductive pads are inserted.

2. The backlight unit of claim 1, wherein the power socket comprises:
   a socket housing; and
   a pair of power supply terminals which are formed in the socket housing and engage the pair of the conductive pads.

3. The backlight unit of claim 2, wherein the pair of the conductive pads are inserted into the socket housing to be electrically connected to the pair of power supply terminals.

4. The backlight unit of claim 2, wherein the pair of power supply terminals comprises a conductive elastic material.

5. The backlight unit of claim 2, wherein the socket housing comprises a pair of grooves into which the pair of the conductive pads are inserted.

6. The backlight unit of claim 2, wherein the socket housing comprises a single groove into which the pair of the conductive pads are inserted.

7. The backlight unit of claim 2, wherein the chassis includes a through hole through which power supply lines for supplying power to the pair of power supply terminals of the power socket pass.

8. The backlight unit of claim 1, wherein the pair of the conductive pads are formed by exposing a conductive material which is formed on the printed circuit board.

9. The backlight unit of claim 1, wherein at least one end of the chassis is bent at a right angle to form a bent portion, and the printed circuit board is connected to an inner surface of the bent portion of the chassis.

10. The backlight unit of claim 1, wherein the printed circuit board has a strip shape, and the light emitting diodes are aligned on the printed circuit board in a line.

11. The backlight unit of claim 1, wherein the end of the printed circuit board is branched into two portions and the pair of conductive pads are formed on the branched portions.

12. The backlight unit of claim 1, wherein a width of the end of the printed circuit board is narrower than other portions of the printed circuit board.

13. An edge light emitting type light emitting diode (LED) backlight unit for a liquid crystal display (LCD) device, the backlight unit comprising:
   a chassis;
   a printed circuit board connected to a side of the chassis, the printed circuit board comprising a plurality of light emitting diodes, and a pair of conductive pads formed on an end of the printed circuit board;
   a power socket which is fixed to at least one side of the chassis to which the printed circuit board is connected and into which the pair of the conductive pads are inserted.

14. The backlight unit of claim 13, wherein the power socket comprises: a socket housing; and
   a pair of power supply terminals which are formed in the socket housing and engage the pair of the conductive pads.

15. The backlight unit of claim 14, wherein the socket housing comprises a pair of grooves into which the pair of the conductive pads are inserted.

16. The backlight unit of claim 14, wherein the socket housing comprises a single groove into which the pair of the conductive pads are inserted.

17. The backlight unit of claim 13, wherein the pair of the conductive pads are formed by exposing a conductive material which is formed on the printed circuit board.

18. The backlight unit of claim 13, wherein the end of the printed circuit board is branched into two portions and the pair of conductive pads are formed on the branched portions.

19. The backlight unit of claim 13, wherein a width of the end of the printed circuit board is narrower than other portions of the printed circuit board.

* * * * *